Oct. 16, 1923.                          1,471,132
A. E. ANDERSON
TROLLEY WIRE SUPPORT
Filed June 29, 1923
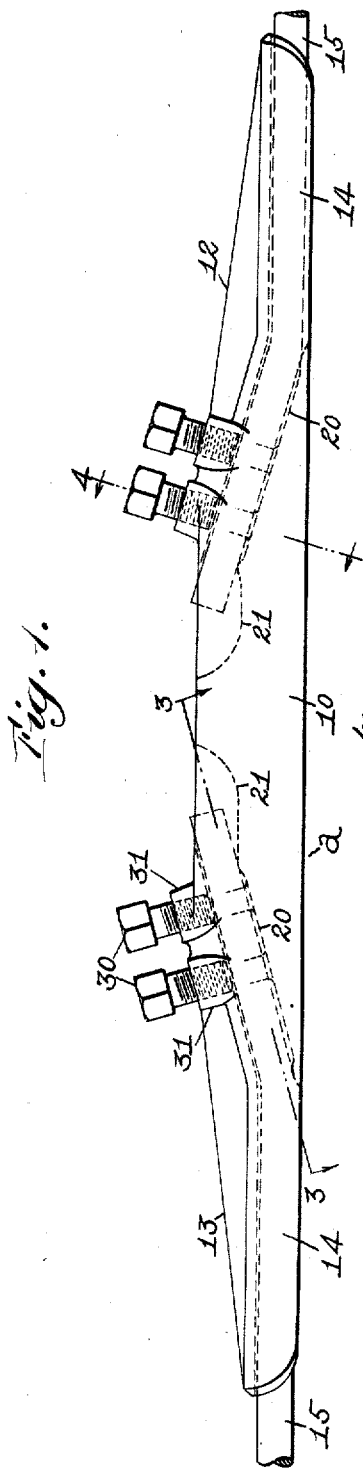
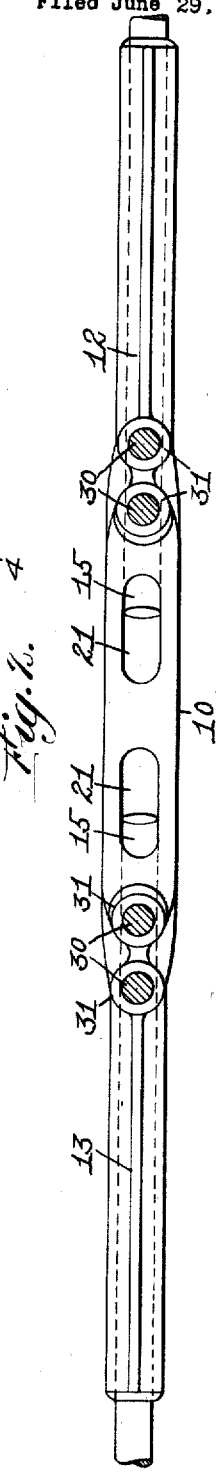
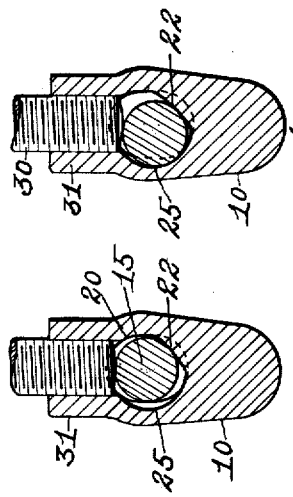
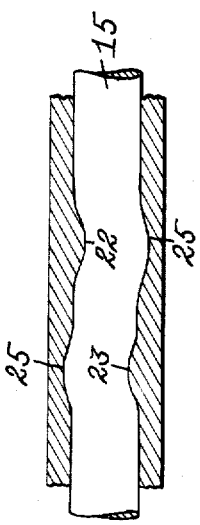
Inventor.
Alf. E. Anderson
by Jas. H. Churchill
Atty.

Patented Oct. 16, 1923.

1,471,132

UNITED STATES PATENT OFFICE.

ALF E. ANDERSON, OF MILTON, MASSACHUSETTS, ASSIGNOR TO ALBERT & J. M. ANDERSON MANUFACTURING COMPANY, OF BOSTON, MASSACHUSETTS, A CORPORATION OF MASSACHUSETTS.

TROLLEY-WIRE SUPPORT.

Application filed June 29, 1923. Serial No. 648,491.

*To all whom it may concern:*

Be it known that I, ALF E. ANDERSON, a citizen of the United States, residing in Milton, in the county of Norfolk and State of Massachusetts, have invented an Improvement in Trolley-Wire Supports, of which the following description, in connection with the accompanying drawings, is a specification, like characters on the drawings representing like parts.

This invention relates to a trolley wire support and is herein shown as embodied in a trolley wire splicer.

The invention has for its object to provide a splicer or like trolley wire support, which is of maximum efficiency and strength to which the trolley wire is secured against removal by strain placed upon the trolley wire.

To this end, the splicer or support is provided with a bore or passage for the reception of the trolley wire, and said bore or passage has on its inner wall one or more lugs or projections, located near the bottom of the bore or passage and acting as cam surfaces to cause the trolley wire to be bent laterally when the pressure is exerted on the trolley wire to force it toward the bottom of said bore or passage.

Preferably a plurality of the cam lugs or projections are employed and located on opposite sides of the longitudinal center of the bore or passage, so as to bend the trolley wire laterally in opposite directions, as will be described.

The particular features of the invention will be pointed out in the claims at the end of this specification.

Fig. 1 is a side elevation of a splicer embodying this invention;

Fig. 2, a plan of the splicer shown in Fig. 1;

Fig. 3, a section on the line 3—3, Fig. 1;

Fig. 4, a cross section on the line 4—4, Fig. 1; and

Fig. 5, a view like Fig. 4 with the trolley wire resting on the cam lugs.

Referring to the drawing, *a* represents one form of splicer embodying this invention. The splicer *a* comprises a body portion 10 and end portions or arms 12, 13 provided with side flanges or lips 14, which are normally separated to form a slot for the reception of one end of a section or length of the trolley wire 15.

The slotted arms 12, 13 are of like construction and each communicates at its inner end with an inclined bore or passage 20 in the body portion 10, which extends to the upper surface of said body portion and preferably terminates in an elongated opening 21. The inclined bore or passage 20 is preferably substantially circular in cross section and of substantially the diameter of the trolley wire, and in accordance with this invention is provided on its inner wall with one or more lugs or projection, which for the best results are located near the bottom of the bore or passage. It is preferred to employ a plurality of lugs or projections and in the present instance two lugs or projections marked 22 and 23 are shown, which are located on opposite sides of the longitudinal center of the bore or passage.

The trolley wire 15 passed through the bore or passage 20 rests upon the lugs or projections, (see Fig. 5) and when pressure is applied to the wire to force it toward the bottom of the bore or passage, the portion of the wire which bears upon the lugs or projections is forced laterally by the latter and is bent out of a straight path in opposite directions after the manner illustrated in Fig. 4, which serves to effectively clamp or secure the trolley wire within the bore against longitudinal movement therein when strain is placed upon the trolley wire by the trolley wheel in the operation of the usual electric car.

It is preferred also to provide the inner wall of the bore on the side opposite to each lug or projection with a slight recess 25 for the reception of the bent portion of the wire, as indicated in Fig. 3. The trolley wire 15 is forced against the cam lugs or projections as herein shown by screws 30, which engage internally threaded bosses 31 located on the body portion 10 in planes passing through the said lugs.

It will be observed that the lugs or projections 22, 23 act as cam surfaces to bend portions of the trolley wire preferably in opposite directions and laterally with relation to the direction in which the screws 30 are moved, and thus effectively clamp the wire within the bore or passage against longitudinal movement therein under strains placed upon it by the trolley wheel.

The invention is herein shown as embodied in a splicer, but it is not desired to limit the invention in this respect as it is equally applicable to section insulators and other supports for the trolley wire.

Claims:

1. A trolley wire support having a bore or passage for the reception of the trolley wire and provided on its interior wall with a lug or projection extended inwardly into said bore or passage, and means cooperating with said trolley wire and lug to move the trolley wire within said bore or passage toward the lug or projection and cause the latter to move a portion of the trolley wire in a direction laterally with relation to that in which said trolley wire is moved by said means.

2. A trolley wire support having a bore or passage for the reception of the trolley wire and provided on its interior wall with a plurality of lugs or projections arranged out of line with each other on opposite interior walls of said bore, and means co-operating with said trolley wire and with said lugs to move the trolley wire within said bore toward said lugs and cause the latter to move portions of the trolley wire in opposite directions and laterally with relation to that in which it is moved by said means.

3. A trolley wire support having a bore or passage for the reception of the trolley wire and provided on its interior wall with a cam surface projecting from said interior wall inwardly into said bore or passage to cooperate with the trolley wire and bend the same in a direction at an angle to that in which pressure is applied to the trolley wire when said trolley wire is forced against said cam surface.

4. A trolley wire support having a bore or passage for the reception of the trolley wire and provided on its interior wall with a lug or projection located on one side of the longitudinal center of said bore and extended inwardly into said bore or passage to bend the trolley wire in a direction at an angle to that in which pressure is applied to the trolley wire and with a recess located in its interior wall on the other side of said longitudinal center and opposite said lug or projection to receive the portion of the trolley wire bent by said lug or projection.

In testimony whereof, I have signed my name to this specification.

ALF E. ANDERSON.